INVENTOR.
N.W. MITCHELL

INVENTOR.
N.W. MITCHELL

United States Patent Office 3,547,805
Patented Dec. 15, 1970

3,547,805
PROCESS AND APPARATUS FOR QUENCHING HOT VAPORS FROM A REACTOR WITH COOLED LIQUID CONDENSED FROM SAID VAPORS AND A WATER SPRAY
Norris W. Mitchell, Bartlesville, Okla., assignor to Phillips Petroleum Company, a corporation of Delaware
Filed Oct. 13, 1967, Ser. No. 675,110
Int. Cl. C10g 7/00, 9/16
U.S. Cl. 208—48    6 Claims

ABSTRACT OF THE DISCLOSURE

Process and apparatus comprising a reactor having an effluent stream of hot vapors in a conduit passing to a fractionator in which coking on the walls of the conduit and the fractionator is substantially reduced by quenching the effluent stream with cooled liquid condensed from said vapors in said fractionator plus a water spray.

FIELD OF THE INVENTION

This invention relates to Class 208, Mineral Oils; Processes and Products, Subclass 348, fractionation, distillation, with nonvapor compound added prior to or during vaporization, wherein a reactor having an effluent stream of hot vapors passing to a fractionator is quenched by a cooled liquid from fractionator, the improvement being the addition of a water spray to the cooled liquid quench.

DESCRIPTION OF THE PRIOR ART

The closest known prior art is United States Pat. 3,133,014 to Cross, patented May 12, 1964, which takes liquid from fractionator 11, cools it at 18, and then sprays it as a liquid into an effluent stream of hot vapors 10 coming from a reactor to quench these vapors as they enter the fractionator. Cross does not have any water spray added, and therefore cannot obtain the unexpected valuable result caused by adding a water spray to the quench, namely the substantial reduction in coke formation in the conduit and in the fractionator due to the vaporizing water spray spreading the recycled liquid in the quench into a more easily vaporizable form, to rapidly desuperheat the hot oil vapors before they can form coke.

SUMMARY OF THE INVENTION

The combination of high temperature over a considerable period of time causes coking of an oil. When oil vapors condense and are kept at a high temperature above about 720 to 750° F. for a long time, coke is formed. The present invention cools the condensed oil so fast it does not coke.

One object is to provide an improved quench. This invention also relates to the object of effecting a substantial reduction in coke formation in a fractionator when liquid from the bottom of said fractionator is recycled and cooled for use as a quench in a feed line from a reactor containing hot effluent vapors from said reactor, by adding a water spray to said quench. The flashing of this water spray into steam unexpectedly has the result of substantially reducing coke formation over merely quenching with the recycled liquid. Numerous other objects, advantages and features of this invention will be obvious to those skilled in the art upon reading the following description, claims and drawings.

DESCRIPTION OF THE PREFERRED EMBODIMENT

Figure 1:
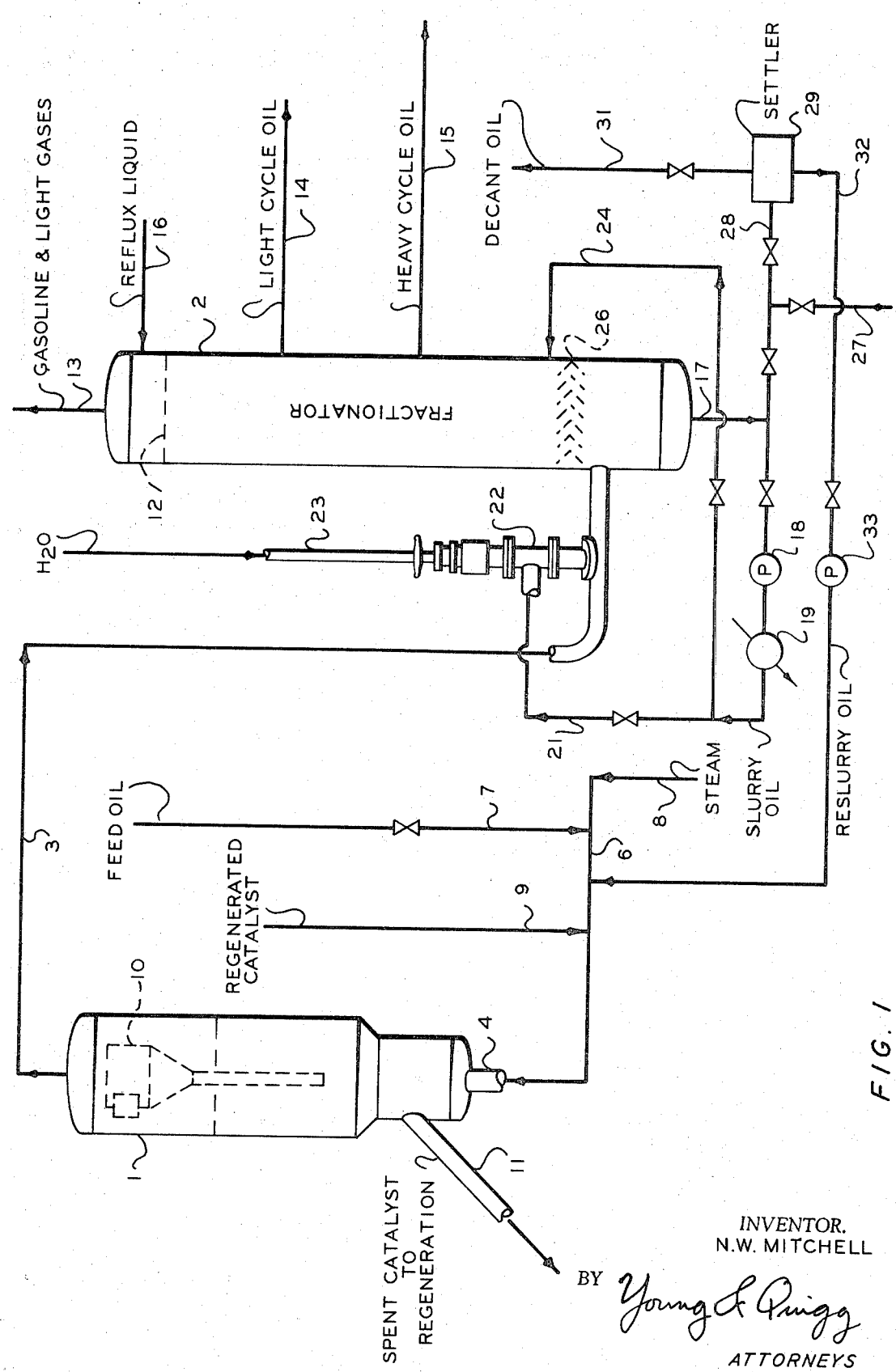
FIG. 1 is an elevational view of a reactor quench and fractionator embodying the present invention.

In FIG. 1, a simplified view is given of a fluidized type of catalytic reactor 1 connected to a fractionator 2 by a hot vapor transfer conduit 3. Various valves, pressure gages and controls often present in such reactors have been omitted as not essential to the invention. This general system is old in Cross 3,133,014 cited above, and in U.S. patent application Ser. No. 412,032 filed Nov. 18, 1964, by Moyer et al.

A feed riser conduit 4 having a manifold section 6 is operatively connected to the reactor 1 in a manner which will allow a feed stock such as gas oil and/or topped crude introduced through conduit 7 and steam introduced by means of conduit 8 to pass into reactor 1. Hot regenerated catalyst from a catalyst regeneration zone (not shown) or the like can be passed into riser 4 by means of a downcomer conduit 9 such that the feed stock and steam will carry the catalyst into the reactor. Spent catalyst which has been steam stripped can be continuously withdrawn from the reactor and passed to said catalyst regeneration zone by means of downcomer conduit 11.

The catalyst is generally in the form of finely divided particles, or powder, which assumes a fluidized condition within the reactor 1. Suitable cracking catalysts which can be used in the practice of this invention include acid activated bentonite clays, and synthetic composite gel catalyst systems such as silica-alumina, silica-magnesia, the molecular sieve type, and the like. The catalyst particles may range in size from about 100 to 400 mesh. A major portion of the particles may range between 20 and 80 microns in diameter. This size catalyst particle is easily fluidized in reactor 1 and easily conveyed through the regeneration equipment (not shown).

The reactor 1 can be any suitable type well known in the art. It is generally preferred to connect conduit 3 to reactor 1 by means of an interiorly disposed cyclone separator 10 which will remove almost all of the entrained catalyst from the hot hydrocarbon vapors before they enter conduit 3. However, some catalyst remains entrained in the hot vapors in pipe 3 and goes over into the lower portion of fractionator 2 where it forms a slurry in the liquids therein.

Fractionator 2 may be provided with the usual plurality of conventional fraction trays 12, which may be of the bubble cap, sieve, plate or other known units. These will serve to separate the converted hydrocarbons into different molecular weight fractions as they condense and/or evaporate in the fractionator. Gasoline and light gases pass overhead out of pipe 13. Light cycle oil is removed through pipe 14 and heavy cycle oil through conduit 15. If desired, separation can be increased by adding a refluxing liquid through line 16 near the top of the fractionator.

The heaviest oil, containing some catalyst and therefore called slurry oil, passes out the bottom of fractionator 2 through line 17 and pump 18 pumps it through a cooler 19 in indirect heat exchange with a cooling fluid. At least part of this cooled slurry oil passes through line 21 to quench 22 into hot vapor conduit 3 along with added water in pipe 23, while the remainder, if any, may be passed through line 24 to flow down over baffle 26, which may be a series of right-angle steel members which serve to knock catalyst out of any vapors passing upward therethrough. The downwardly flowing cooled slurry oil from conduit 24 passing over baffle 26 serves to insure the washing back of catalyst below baffle 26, even though the slurry oil has catalyst in it.

This completes the description of parts in FIG. 1 involved in this invention, except that the slurry oil would build up, so some is removed from the system, either thrown away through line 27, or more preferably removed through line 28 to settler 29 where the major portion of the oil substantially free of catalyst can be withdrawn as decant oil through line 31, and the catalyst concentrated reslurry oil in line 32 can be pumped by pump 33 into the manifold 6 back to reactor 1.

Figures 2, 3:
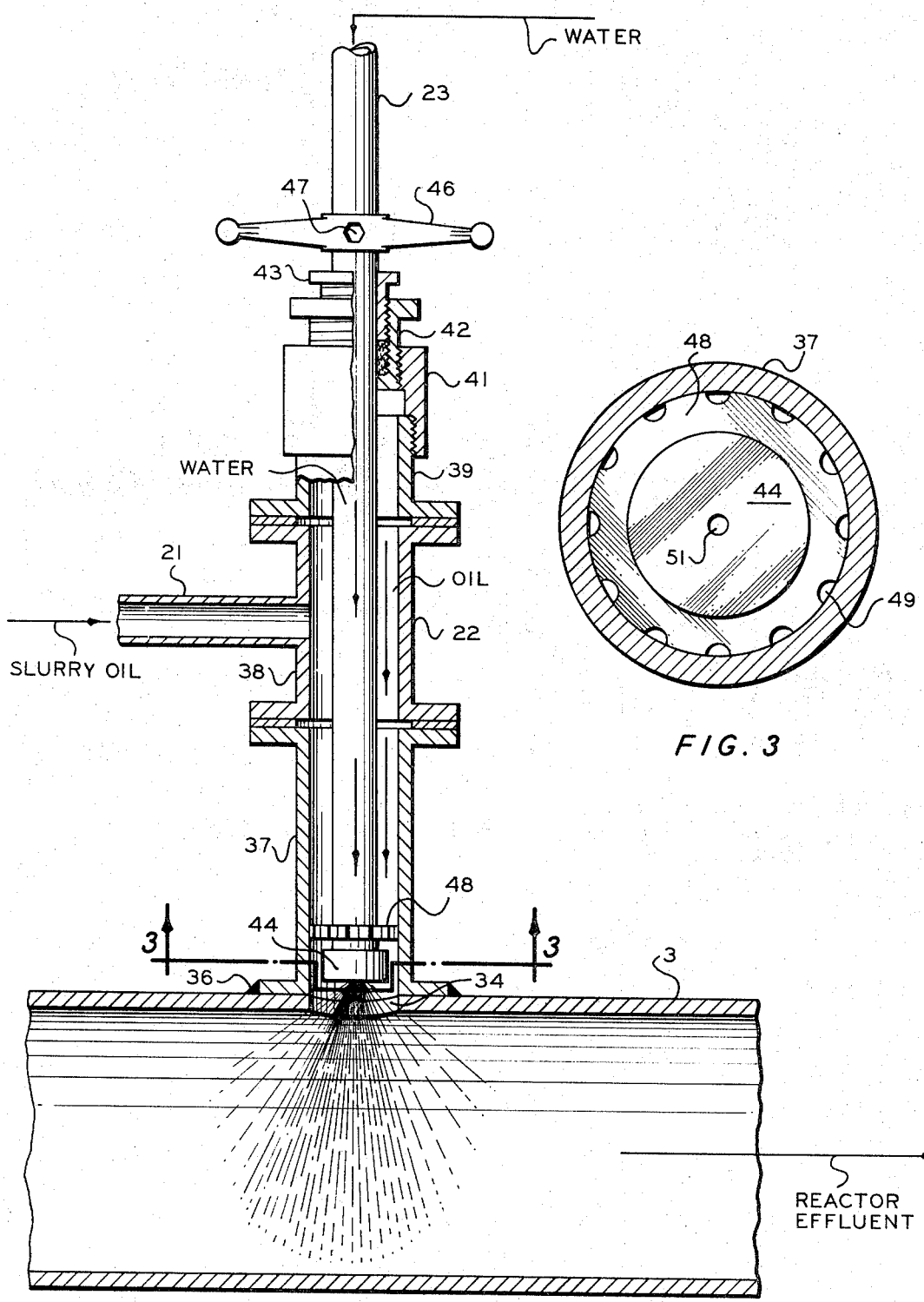
FIG. 2 is an enlarged elevational view partly in cross section showing details of construction of a quench embodying the present invention, said quench being also shown in FIG. 1.
FIG. 3 is a cross-sectional view of a portion of FIG. 2 taken along the line 3—3 looking in the direction indicated by the arrows.

FIG. 2 shows the details of quench 22. Quench 22 is secured in position over a hole 34 in hot vapor conduit 3 by any means, such as welding at 36. It is convenient to make quench 22 in sections, namely, pipe 37, T 38, nipple 39, coupling 41, stuffing box 42, and follower 43. The water line 23 passes through stuffing box 42 in sealing engagement and has a conventional spray nozzle 44 on its end directed to spray a diverging cone of water drops into conduit 3. The position of nozzle 44 may be adjusted by handle 46 secured to pipe 23 by set screw 47. An oil distributing collar 48 is secured to pipe 23.

In FIG. 3 it will be seen that collar 48 may be provided with a plurality of oil passages, or grooves 49, if desired, or may be solid with a small annular space between collar 48 and pipe 23, to allow slurry oil to pass from pipe 21, T 38, and pipe 37, into conduit 3. Water spray from hole 51 in nozzle 44 passes out as a divergent cone through the cylindrical sheath of oil emerging into conduit 3 around collar 48 and breaks the oil up into smaller more dispersed and more easily evaporated particles. The water is flashing into steam in hot conduit 3 and further disperses the rapidly evaporating oil into the hot vapors containing some catalyst dust, which passes through conduit 3 into fractionator 2 without depositing any substantial amount of coke therein.

EXAMPLE I

The apparatus shown in FIG. 1 is operated with the following flows in the pipes having the reference numerals indicated in Table 1 below:

TABLE 1

| Drawing reference No. of line | Material added | Amounts added | |
|---|---|---|---|
| | | Number | Units |
| 8 | Steam (400 p.s.i.g.) | 16,000 | Lbs./hr. |
| 7 | Gas oil | 60,947 | Bbls./day. |
| 3 | Vapors (before quench) | 82,983 | MSCF/day. |
| 21 | Slurry | 96,300 | Bbls./day. |
| 23 | Water | 1,710 | Bbls./day. |
| 13 | Overhead (net oil vapors) | 71,276 | MSCF/day. |
| 14 | Light cycle oil | 5,100 | Bbls./day. |
| 15 | Heavy cycle oil | 26,947 | Bbls./day. |
| 17 | Bottom yield | 193,200 | Bbls./day. |
| 24 | Slurry | 96,000 | Bbls./day. |
| 31 | Decant oil | 600 | Bbls./day. |
| 16 | Reflux liquid | 60,000 | Bbls./day. |
| 9 | Catalyst (regenerated) | 20 | Tons/min. |
| 11 | Catalyst (spent) | 20 | Tons/min. |
| 32 | Reslurry oil | 300 | Bbls./day. |
| 27 | Slurry oil (optional) | None | |

With water injection of 1710 bbls./day and slurry injection of 96,300 bbls./day it is estimated it will be well over 18 months before sufficient coke will be laid down to cause any difficulties, whereas in the prior art with no water injection and 98,328 bbls./day slurry quench, coke deposits will cause a shutdown in about 2 months.

The water temperature can vary from 40° F. to 200° F. but as calculated in Table 1 it is about 80° F. As the water temperature goes up enough more water is injected to achieve the same cooling effect, which adjustment can be calculated by any engineer, the slurry injection rate remaining the same.

The other temperatures are about as shown in Table 2 below:

TABLE 2

| Part No. | Point | Approximate temperature, °F. |
|---|---|---|
| 3 | Before quench 22 | 950 |
| 3 | After quench 22 | 680 |
| 13 | Overhead at 13 | 250 |
| 21 | Slurry after 19 | 500 |
| 24 | Slurry after 19 | 500 |

The invention is not limited to the above description of an illustrative embodiment thereof, as it will be evident to those skilled in the art that various modifications may be made without departing from the spirit or scope thereof.

Having described the invention, I claim:

1. The process of quenching hot hydrocarbon vapors in a hot vapor zone comprising the steps of injecting liquid hydrocarbons as a sheath around a water injection point into said hot vapor zone and injecting water through said water injection point inside said injected liquid hydrocarbons in the form of an expanding cone of drops intersecting the path of said liquid hydrocarbons into said hot vapor zone whereby said water flashes into steam and disperses said liquid hydrocarbon into more readily evaporatable form, whereby coking of said quenched hydrocarbon vapors is substantially reduced.

2. The process of claim 1 in which the quenching step is in the hot vapor zone between the top of a catalytic cracking zone and a fractionation zone, and the cooled liquid hydrocarbons are collected from the bottom of the fractionator, cooled by indirect heat exchange, and are injected as said cooled liquid hydrocarbons into said hot vapor zone to quench said hot vapors.

3. The process of claim 2 in which some cooled hydrocarbon is injected in the fractionation zone above the point of entry of hot vapors from said hot vapor zone to wash down the traces of entrained catalyst coming from the catalytic cracking zone.

4. A hot hydrocarbon vapor quench comprising in combination a source of hot hydrocarbon vapors, a fractionator for said vapors, a conduit connecting said source and said fractionator to convey said vapors into said fractionator, a quench chamber connected to said conduit, means including a spray nozzle for injecting water, means for injecting liquid hydrocarbon into said hot vapors adjacent said quench chamber comprising a plate substantially the diameter of the quench chamber leaving a substantially annular space through which the liquid hydrocarbon is injected as a sheath around the water spray nozzle, the water spray nozzle being disposed and adapted to spray the water in the form of an expanding cone intersecting the injected hydrocarbon.

5. The apparatus of claim 4 in which the source of hot hydrocarbon vapors is a catalytic cracker, and a pipe containing a pump connects the bottom of the fractionator to the means for injecting the hydrocarbon.

6. The apparatus of claim 5 in which there is a branch line from said pump to said fractionator at a point in said fractionator above the point where said conduit connects to said fractionator, to inject liquid hydrocarbon into said fractionator to wash down the traces of entrained catalyst coming from the catalytic cracker.

References Cited
UNITED STATES PATENTS

| | | | |
|---|---|---|---|
| 2,928,886 | 3/1960 | Nisbet et al. | 260—683 |
| 3,015,619 | 1/1962 | Wimmer et al. | 208—48 |
| 3,133,014 | 5/1964 | Cross | 208—348 |
| 3,154,385 | 10/1964 | Jacobs et al. | 23—284 |
| 3,174,924 | 3/1965 | Clark et al. | 208—48 |
| 3,256,357 | 6/1966 | Baumann et al. | 260—672 |
| 3,244,765 | 4/1966 | Fauser | 260—679 |

DELBERT E. GANTZ, Primary Examiner

G. E. SCHMITKONS, Assistant Examiner

U.S. Cl. X.R.

202—158; 203—98; 208—348